United States Patent
Yabu et al.

(10) Patent No.: US 10,578,033 B2
(45) Date of Patent: *Mar. 3, 2020

(54) CONTROL UNIT FOR INTERNAL COMBUSTION ENGINE

(71) Applicant: AISIN SEIKI KABUSHIKI KAISHA, Kariya-shi, Aichi (JP)

(72) Inventors: Satoshi Yabu, Anjo (JP); Masaaki Kaneko, Aichi (JP)

(73) Assignee: AISIN SEIKI KABUSHIKI KAISHA, Kariya-Shi, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/556,275

(22) PCT Filed: Mar. 30, 2016

(86) PCT No.: PCT/JP2016/060406
§ 371 (c)(1),
(2) Date: Sep. 6, 2017

(87) PCT Pub. No.: WO2016/159090
PCT Pub. Date: Oct. 6, 2016

(65) Prior Publication Data
US 2018/0045125 A1 Feb. 15, 2018

(30) Foreign Application Priority Data
Apr. 2, 2015 (JP) .................. 2015-076055

(51) Int. Cl.
*F02D 13/02* (2006.01)
*F01L 1/344* (2006.01)
(Continued)

(52) U.S. Cl.
CPC .......... *F02D 13/0238* (2013.01); *F01L 1/344* (2013.01); *F01L 1/352* (2013.01);
(Continued)

(58) Field of Classification Search
CPC .................................................. F02D 13/0249
See application file for complete search history.

(56) References Cited

U.S. PATENT DOCUMENTS 5,924,395 A * 7/1999 Moriya ................... B60K 6/46
123/90.15
5,979,380 A 11/1999 Nakadouzono et al.
(Continued)

FOREIGN PATENT DOCUMENTS

CN 101595290 A 12/2009
JP 05-248277 A 9/1993
(Continued)

OTHER PUBLICATIONS

U.S. Appl. No. 15/556,267, filed Sep. 6, 2017, Satoshi Yabu et al.
(Continued)

*Primary Examiner* — Patrick Hamo
*Assistant Examiner* — Wesley G Harris
(74) *Attorney, Agent, or Firm* — Buchanan Ingersoll & Rooney PC

(57) ABSTRACT

A control unit for an internal combustion engine is configured for allowing smooth operation of the internal combustion engine by increasing an intake amount while maintaining an opening timing of an intake valve constant, at the time of low-rotation, high-load state. A valve opening/closing timing control apparatus includes a phase adjustment mechanism configured to vary a relative rotational phase between a driving side rotary body rotatable in synchronism with a crankshaft of the internal combustion engine and a driven side rotary body rotatable together with an intake cam shaft. After an opening timing of the intake valve, the relative rotational phase is displaced in the advancing direction.

3 Claims, 9 Drawing Sheets

(51) Int. Cl.
  *F01L 1/356* (2006.01)
  *F01L 1/352* (2006.01)
  *F01L 1/047* (2006.01)
(52) U.S. Cl.
  CPC .............. *F01L 1/356* (2013.01); *F02D 13/02* (2013.01); *F02D 13/0234* (2013.01); *F02D 13/0261* (2013.01); *F01L 1/047* (2013.01); *F02D 2200/50* (2013.01); *Y02T 10/18* (2013.01)

(56) References Cited

U.S. PATENT DOCUMENTS

| | | | |
|---|---|---|---|
| 2002/0092488 A1* | 7/2002 | Aoyama | F01L 13/0021 123/90.16 |
| 2007/0051332 A1 | 3/2007 | Uehama et al. | |
| 2009/0265077 A1* | 10/2009 | Urushihata | F01L 1/34 701/103 |
| 2010/0043745 A1 | 2/2010 | Kuzuyama | |
| 2012/0023935 A1* | 2/2012 | Pursifull | F02M 26/42 60/605.2 |

FOREIGN PATENT DOCUMENTS

| | | |
|---|---|---|
| JP | 10-103030 A | 4/1998 |
| JP | 10-176558 A | 6/1998 |
| JP | 10-227236 A | 8/1998 |
| JP | 2007-321768 A | 8/2004 |
| JP | 2004-293483 A | 10/2004 |
| JP | 2007-71058 A | 3/2007 |
| JP | 2009-257186 A | 11/2009 |

OTHER PUBLICATIONS

International Search Report (PCT/ISA/210) dated Jun. 14, 2016, by the Japanese Patent Office as the International Searching Authority for International Application No. PCT/JP2016/060406.

Written Opinion (PCT/ISA/237) dated Jun. 14, 2016, by the Japanese Patent Office as the International Searching Authority for International Application No. PCT/JP2016/060406.

* cited by examiner

CONTROL UNIT FOR INTERNAL COMBUSTION ENGINE

TECHNICAL FIELD

This invention relates to a control unit for an internal combustion engine, including a valve opening/closing timing control apparatus for setting an opening/closing timing of an intake valve of the internal combustion engine.

BACKGROUND ART

Patent Document 1 discloses a technique having a valve opening/closing timing control apparatus (referred to as a "variable valve timing apparatus" in the above document) for setting opening/closing timings of an intake valve and an exhaust valve simultaneously. With this, the technique provides a control according to which when an engine load is below a predetermined value, closing timings of both the intake valve and the exhaust valve are retarded with maintaining an overlap between the intake valve and the exhaust valve constant.

Patent Document 2 discloses a technique having a valve opening/closing timing control apparatus (referred to as an "intake timing varying mechanism" in the above document) for setting an opening/closing timing of an intake valve and a valve opening/closing timing control apparatus (referred to as an "exhaust timing varying mechanism" in the above document) for setting an opening/closing timing of an exhaust valve, and a center timing of an overlap between the intake valve and the exhaust valve is varied according to a load.

Further, Patent Document 3 discloses a technique according to which a lift amount of an intake valve is varied by a variable lift mechanism. This Patent Document 3 describes that when the valve lift amount is varied, opening/closing timings of the intake valve are changed also.

CITATION LIST

Patent Literature

Patent Document 1: Japanese Unexamined Patent Application Publication Hei. 5-248277
Patent Document 2: Japanese Unexamined Patent Application Publication Hei. 10-176558
Patent Document 3: Japanese Unexamined Patent Application Publication No. 2007-321768

SUMMARY OF INVENTION

Technical Problem

When an internal combustion engine is under a low-rotation, high-load state, for avoiding engine stall and maintaining smooth rotational state at the same time, it is believed effective to increase the engine output by seeking for increase of an intake amount to a combustion chamber and to seek for increase of fuel supply thereto. Further, for an internal combustion engine having a valve opening/closing timing control apparatus mounted to an intake cam shaft, in order to seek for increase of intake amount, it is conceivable also to increase the lift amount of the intake valve in operative association with increase of intake amount by a throttle valve as disclosed in Patent Document 3 for instance.

However, with such increase of lift amount of the intake valve, increase of the intake amount at the intake valve is made possible, yet this results in advancing of the opening time thereof. Thus, its overlap with the exhaust valve is increased. As a result, it is believed that the above arrangement invites knocking phenomenon due to the influence of hot residual gas.

For this reason, there is a need for a control unit for an internal combustion engine, which unit allows smooth operation of the internal combustion engine through state control at the time of low-speed, high-load state.

Solution to Problem

According to a characterizing feature of the present invention, a valve opening/closing timing control apparatus includes:

a driving side rotary body rotatable about a rotational axis in synchronism with a crankshaft of an internal combustion engine; a driven side rotary body mounted rotatably about the same axis as the rotational axis relative to the driving side rotary body, the driven side rotary body being rotatable together with an intake cam shaft controlling opening/closing of an intake valve of the internal combustion engine; and a phase adjustment mechanism configured to set a relative rotational phase between the driving side rotary body and the driven side rotary body;

the intake cam shaft being configured to open/close the intake valves of a plurality of cylinders with a predetermined rotational angular spacing therebetween;

after an opening timing of the intake valve, an advancing operation being effected to displace the relative rotational phase in an advancing direction relative to the opening timing; and subsequently, the relative rotational phase being displaced in a direction of a retarding operation releasing the advancing operation in order to cause the intake valve of another cylinder which is to effect an intake operation next to open at an original opening timing.

With the above, for instance, in case an advancing operation of the valve opening/closing timing control apparatus is effected after the opening timing of the intake valve and a retarding operation thereof is effected immediately thereafter, this makes it possible to improve the charging ratio through increase of the intake amount, without changing the opening timing of the intake valve. Thus, with the increase of the intake amount, generation of a tumble flow in the combustion chamber is made possible also. Next, in order to suppress the influence to the cylinder which is to effect the opening operation of the intake valve next, a retarding operation of the valve opening/closing timing control apparatus is effected before the next intake valve effects its opening operation, thus resolving the foregoing advancing operation. With this, increase of the intake amount is made possible also for the cylinder which is to open the intake valve next.

Accordingly, there has been configured a control unit for an internal combustion engine, that increases a charging ratio of the intake amount to the combustion chamber with maintaining the opening timing of the intake valve at the time of low-rotation, high-load state, thereby to allow smooth operation of the internal combustion engine by generation of a tumble flow.

In the present invention, preferably, the phase adjustment mechanism sets the relative rotational phase between the driving side rotary body and the driven side rotary body by an electrically powered actuator; and there is provided a controlling section controlling the electrically powered actuator.

With the above-described arrangement, in comparison with e.g. an arrangement wherein the relative rotational phase is displaced with utilization of a fluid pressure, the valve timing control apparatus configured to displace the relative rotational phase by a driving force of an electrically powered actuator provides an advantage of ability to effect displacement at a high speed. For this reason, as the controlling section controls the electrically powered actuator, an advancing operation and a retarding operation subsequent thereto of the valve opening/closing timing control apparatus, after opening of the intake valve, can be effected at high speeds.

In the present invention, preferably, the opening timing is set after passage of a piston of a combustion chamber of the internal combustion engine through a top dead center.

With the above-described arrangement, after the piston reaches the top dead center and then begins its lowering movement, thereby to shift the combustion chamber into a negative pressure state, the opening timing is reached to start opening of the intake valve. Therefore, an even stronger tumble flow can be generated in the combustion chamber, so that the combustion condition in the combustion chamber is improved thus enabling resolving of knocking phenomenon. Also, as the knocking phenomenon is resolved, advanced ignition is made possible, thus leading also to improvement of the output of the internal combustion engine, also.

In the present invention, preferably, the controlling section sets a period required for the advancing operation longer than a period required for the retarding operation.

At the time of operation of an internal combustion engine, a cam fluctuation torque is applied to the intake cam shaft in the retarding direction. Therefore, if the period of driving the electrically powered actuator for effecting the advancing operation is set longer than the period of driving the electrically powered actuator for effecting the retarding operation, it becomes possible to effect easily the control for making a displacement amount of the relative rotational phase by the advancing operation equal to a displacement amount of the relative rotational phase by the retarding operation.

In the present invention, preferably:

the control unit further comprises:

a rotational speed sensor detecting a rotational speed per unit time of the crankshaft;

a phase sensor detecting the relative rotational phase; and a load sensor detecting a load applied to an output transmission system from the crankshaft;

wherein the controlling section controls the electrically powered actuator, based on detection results of the rotational speed sensor, the phase sensor and the load sensor, when it is determined from a result of detection of the rotational speed sensor that a rotational speed per unit time of the crankshaft is below a set value.

With the above-described arrangement, in a situation when a rotational speed per unit time of the crankshaft is below a set value, the control for increasing the intake amount through control of the electrically powered actuator can be effected only when e.g. the load detected by the load sensor exceeds the predetermined value.

DESCRIPTION OF EMBODIMENTS

Next, one embodiment will be explained with reference to the drawings.

[Basic Configuration]

Figure 1:
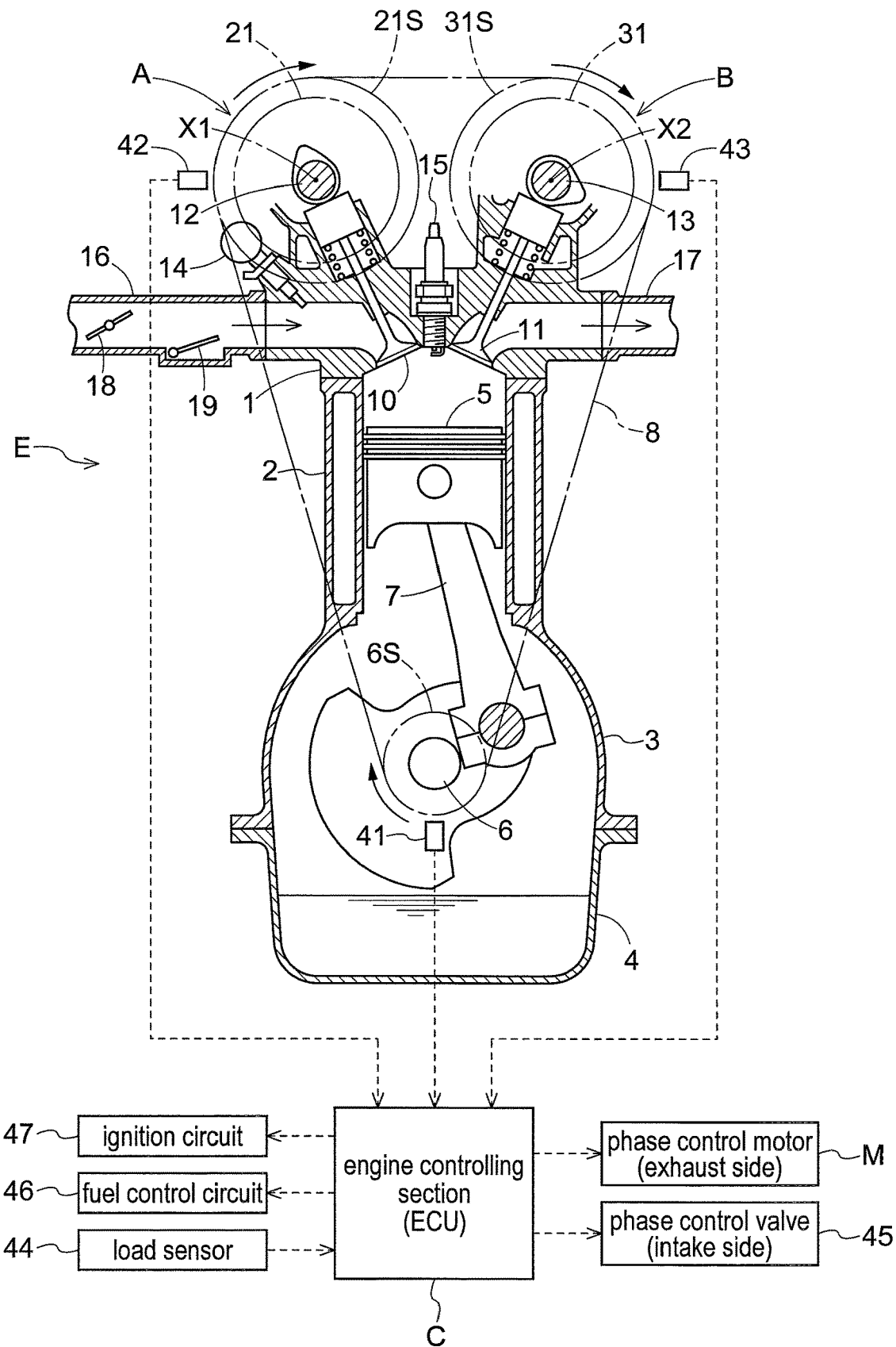
FIG. 1 is a view showing a section of an engine and a block diagram of a control unit.
Figure 2:
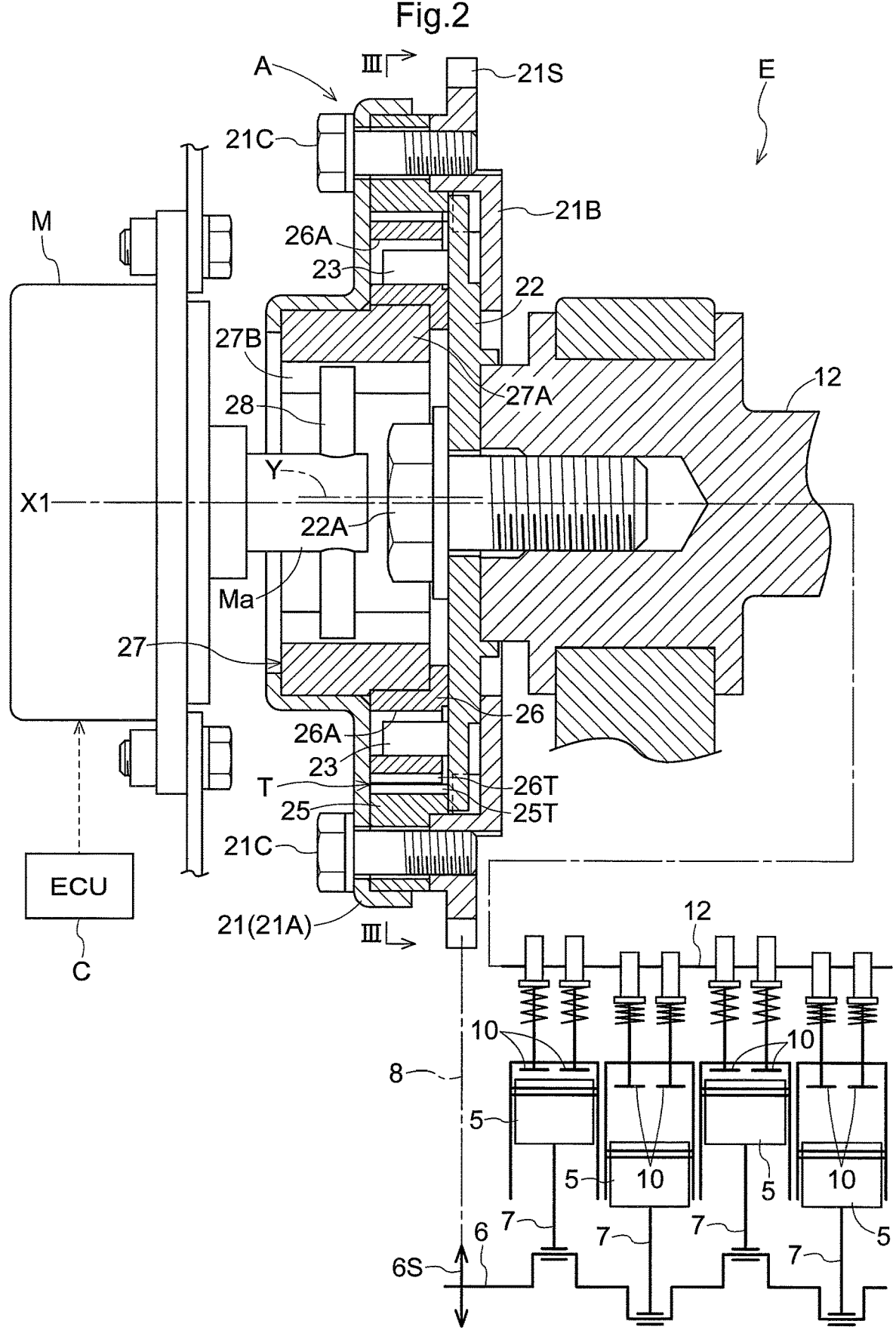
FIG. 2 is a side view in vertical section of an intake side valve opening/closing timing control apparatus.
Figure 4:
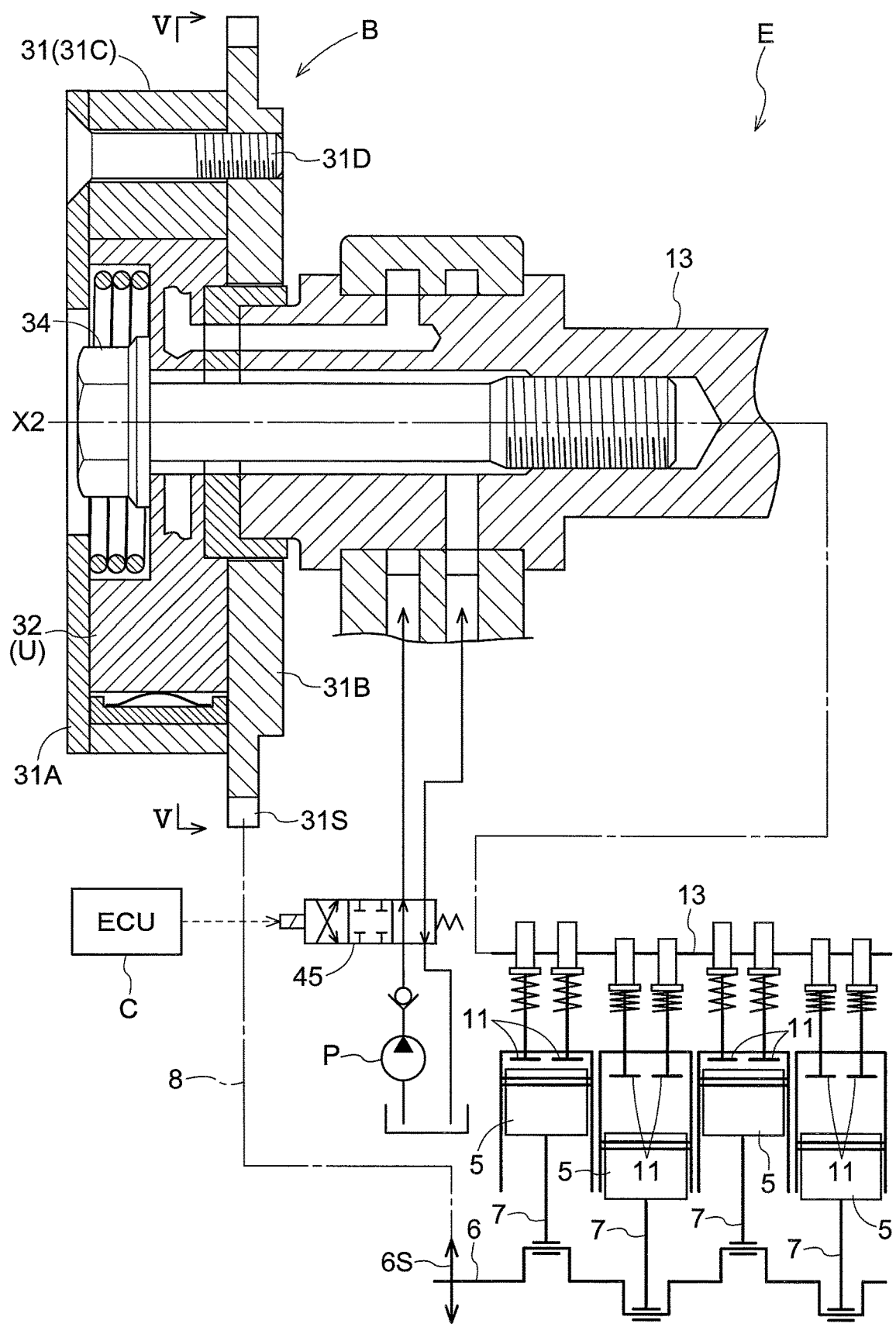
FIG. 4 is a vertical section of an exhaust side valve opening/closing timing control apparatus.

As shown in FIGS. 1, 2 and 4, a control unit for an internal combustion engine is constituted of an intake side valve opening/closing timing control apparatus A for setting an intake timing of an engine E, an exhaust side valve opening/closing timing control apparatus B for setting an exhaust timing of the engine E, and an engine controlling section C for controlling the above apparatuses A, B.

The engine controlling section C controls the intake side valve opening/closing timing control apparatus A and the exhaust side valve opening/closing timing control apparatus B individually, thereby to set optimal intake timing (intake timing) and optimal exhaust timing (exhaust timing) respectively, according to an operational state of the engine E. Simultaneously with the above, the engine controlling section C contemplates increase of an intake amount with maintaining an opening timing IVO of an intake valve 10 through control of the intake side valve opening/closing timing control apparatus A at the time of low-rotation, high-load state. This control will be described in details later herein.

[Engine]

The engine E is configured as a four-cylinder, four-cycle type, in which a cylinder head 1, a cylinder block 2, a crankcase 3 and an oil pan 4 are vertically superposed and connected to each other. Pistons 5 are accommodated within a plurality of cylinder bores defined in the cylinder block 2. And, a crank shaft 6 rotatably supported to the crankcase 3 and the pistons 5 are connected via a connecting rod 7. Incidentally, although the four-cylinder engine E is shown in FIGS. 2 and 4, the engine E can also have other plurality of cylinders such as two cylinders, three cylinders, etc.

In the cylinder head 1, at a position joining a combustion chamber and an intake passage, the openable/closable intake valve 10 is mounted, and at a position joining the combustion chamber and an exhaust passage, an openable/closable exhaust valve 11 is mounted. Further, upwardly of these, an intake cam shaft 12 and an exhaust cam shaft 13 are provided for opening/closing the intake valve 10 and the exhaust valve 11 independently of each other. On an intake passage side of the cylinder head 1, a fuel injection nozzle 14 is provided, and a spark plug 15 is provided in the combustion chamber.

To a lateral face of the cylinder head 1, an intake manifold 16 connected to a plurality of intake passages and an exhaust manifold 17 connected to a plurality of exhaust passages are connected. Further, inside the intake manifold 16, there are mounted a throttle valve 18 and a tumble control valve 19.

With this engine E, a timing chain 8 is routed and wound around a drive sprocket 6S mounted on the crank shaft 6, an intake side sprocket 21S of the intake side valve opening/closing timing control apparatus A and an exhaust side sprocket 31S of the exhaust side valve opening/closing timing control apparatus B. With this arrangement, a driving force in synchronism with rotation of the crank shaft 6 is transmitted to the intake cam shaft 12 and the exhaust cam shaft 13 and settings of the intake timing by the intake side valve opening/closing timing control apparatus A and the exhaust timing by the exhaust side valve opening/closing timing control apparatus B are realized.

[Intake Side Valve Opening/closing Timing Control Apparatus]

Figure 3:
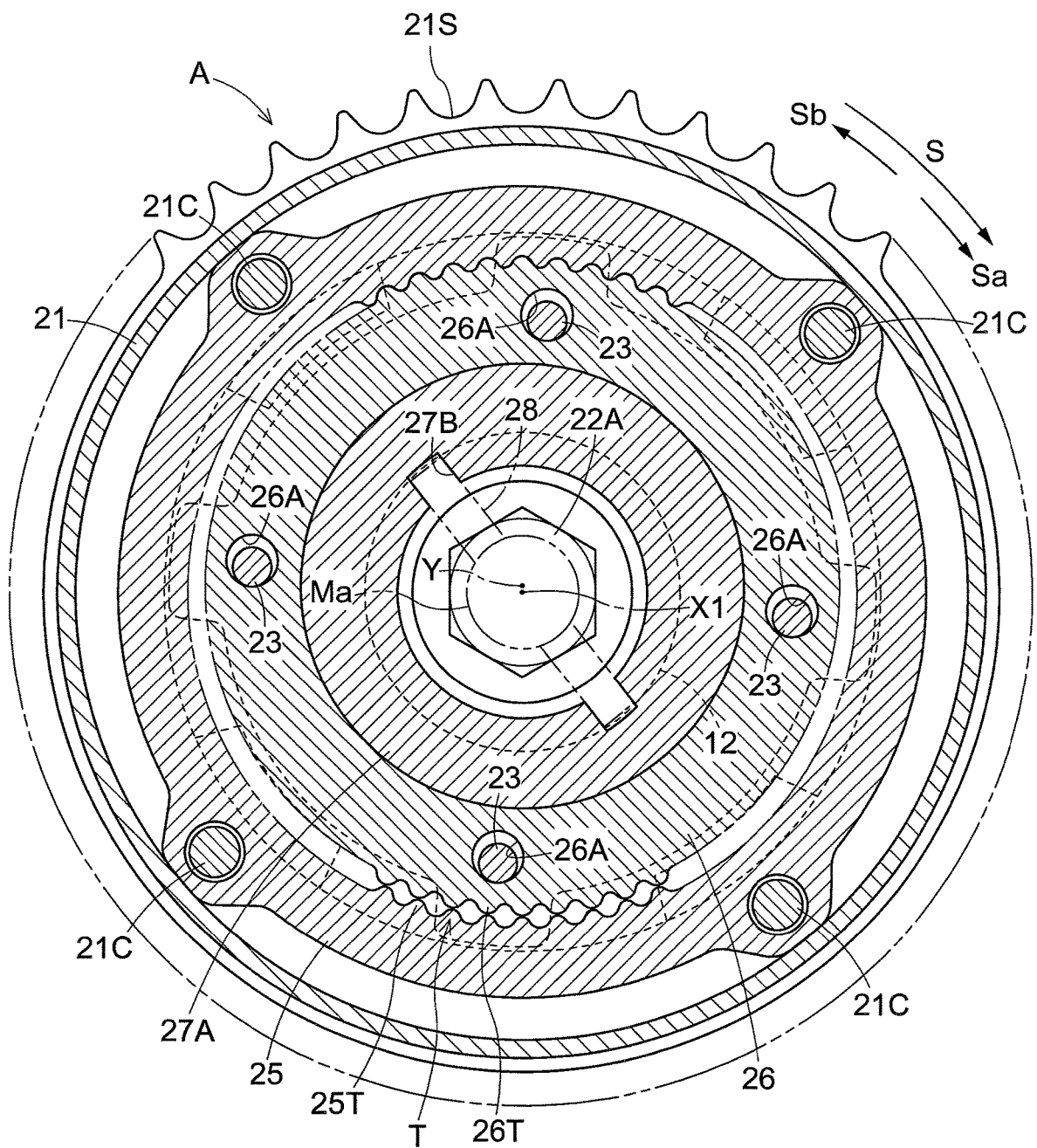
FIG. 3 is a section taken along a line III-III in FIG. 2.

The intake side valve opening/closing timing control apparatus A, as shown in FIGS. 2 and 3, includes an intake side case 21 (an example of a "driving side rotary body"), an intake side rotor 22 (an example of a "driven side rotary body"), and a phase adjustment mechanism T for setting a relative rotational phase between the intake side case 21 (an example of the "driving side rotary body") and the intake side rotor 22 (an example of the "driven side rotary body") by means of a driving force of a phase control motor M as an "electrically powered actuator". In particular, the phase adjustment mechanism T can be constituted by using not the phase control motor M as the electrically powered actuator, but using an actuator operable by a fluid pressure such as an oil pressure.

The intake side case 21 (an example of the "driving side rotary body") is disposed coaxially with a first axis X1 (an example of a "rotational axis") which constitutes also a rotational axis of the intake cam shaft 12 and forms the intake side sprocket 21S in its outer circumference. This intake side case 21 is configured such that a front plate 21A and a rear plate 21B are fastened to each other with fastener bolts 21C. The intake side rotor 22 (an example of the "driven side rotary body") is mounted coaxially with the first axis X1 and rotatably relative to the intake side case 21. The intake side rotor 22 is connected to the intake cam shaft 12 with a connecting bolt 22A to be rotatable in unison with the intake cam shaft 12.

With this intake side valve opening/closing timing control apparatus A, when receiving the driving force from the timing chain 8, the entire apparatus A is rotated in a driving rotational direction S. And, a direction of displacement in the same direction as the driving rotational direction S of the relative rotational phase of the intake side rotor 22 relative to the intake side case 21 by the driving force of the phase control motor M will be referred to as an advancing direction Sa and a displacement in the opposite direction thereto will be referred to as a retarding direction Sb, respectively.

The phase adjustment mechanism T includes a ring gear 25 rotatable together with the intake side case 21 and has a plurality of inner tooth portions 25T, an inner gear 26 having a plurality of outer tooth portions 26T to be meshed therewith, and an eccentric cam body 27. Further, the intake side rotor 22 includes a plurality of linking members 23 projecting in form of shafts.

The ring gear 25 is configured as an inner tooth gear having a predetermined number of inner tooth portions 25T. The inner gear 26 is configured as an outer tooth gear that has outer tooth portions 26T which are fewer in number than the teeth of the ring gear 25 and defines a hole portion at the center thereof. This inner gear 26 defines a plurality of linking hole portions 26A having a greater diameter than the linking members 23. As the linking member 23 is inserted into the linking hole portion 26A, this arrangement functions as a shaft joint. Instead of this arrangement, an Oldham coupling, etc. can also be employed.

The eccentric cam body 27 comprises an integral formation consisting of a cylindrical cam body disposed coaxially with the first axis X1 and a cam portion 27A formed cylindrical about an eccentric axis Y which is eccentric relative to the cam body. With this intake side valve opening/closing timing control apparatus A, the cam body is supported to be rotatable about the first axis X1 relative to the intake side case 21 and the cam portion 27A is relatively rotatably fitted within the hole portion of the inner gear 26.

In the phase control motor M, an engaging pin 28A supported to the engine E and mounted under a perpendicular posture relative to an output shaft Ma is engaged in an engaging groove 27B of the eccentric cam body 27. Incidentally, a brushless motor is used as the phase control motor M. Instead of this, a synchronous motor such as a stepping motor, etc. can be used also.

With the above-described arrangement, in case the eccentric cam body 27 is rotated by the driving force of the phase control motor M, the cam portion 27A is rotated about the first axis X1, whereby the inner gear 26 starts revolving about the first axis X1. At the time of this revolving, meshing position between the outer tooth portion 26T of the inner gear 26 and the inner tooth portion 25T of the ring gear 25 is displaced along the inner circumference of the ring gear 25, whereby the inner gear 26 is rotated slightly about the eccentric axis Y of its own.

Further, in case the inner gear 26 has revolved only for one revolution, the inner gear 26 is rotated (rotated about its own axis) relative to the ring gear 25 by an angle corresponding to the difference of number of teeth between the number of the inner tooth portions 25T of the ring gear 25 and the number of the outer tooth portions 26T of the inner gear 26, so a large speed reduction is realized. Although this rotation of inner gear 26 does not take place about the first axis X1, this rotation is transmitted to the intake side rotor 22 via the linking members 23 fitted into the linking hole portions 26A. As a result, there is realized a displacement of the relative rotational phase of the intake side rotor 22 relative to the intake side case 21. Incidentally, the gear arrangement of the phase adjustment mechanism T is not limited to the arrangement shown in FIG. 2 and FIG. 3.

With this intake side valve opening/closing timing control apparatus A, as an output shaft Ma of the phase control motor M is driven to rotate in the same direction and with an equal speed as/to the rotational speed of the intake cam shaft 12, the relative rotational phase is maintained. Further, control mode is set such that the relative rotational phase is displaced in the advancing direction Sa or the retarding direction Sb through increase or decrease of the rotational speed of the phase control motor M. The displacement direction (either the advancing direction Sa or the retarding direction Sb) of the relative rotational phase relative to increase or decrease in the rotational speed of the phase control motor M is determined by the gear arrangement of the phase adjustment mechanism T.

In particular, since the relative rotational phase is displaced by means of the driving force of the phase control motor M, a high speed operation is possible, in comparison with an arrangement of realizing the displacement by means of an oil pressure and this displacement of the relative rotational phase can be effected at an extremely high speed.

This intake side valve opening/closing timing control apparatus A has an arrangement which is basically same as the technique disclosed in Japanese Unexamined Patent Application Publication 2007-71058, Japanese Unexamined Patent Application Publication 2009-257186, etc. Further, the configuration of the intake side valve opening/closing timing control apparatus A is not particularly limited to the configuration described in the above embodiment or those disclosed in the above-identified publications, as long as the relative rotational phase between the intake side case 21 and the intake side rotor 22 is displaced by means of a driving force of an electrically powered actuator.

[Exhaust Side Valve Opening/Closing Timing Control Apparatus]

Figure 5:
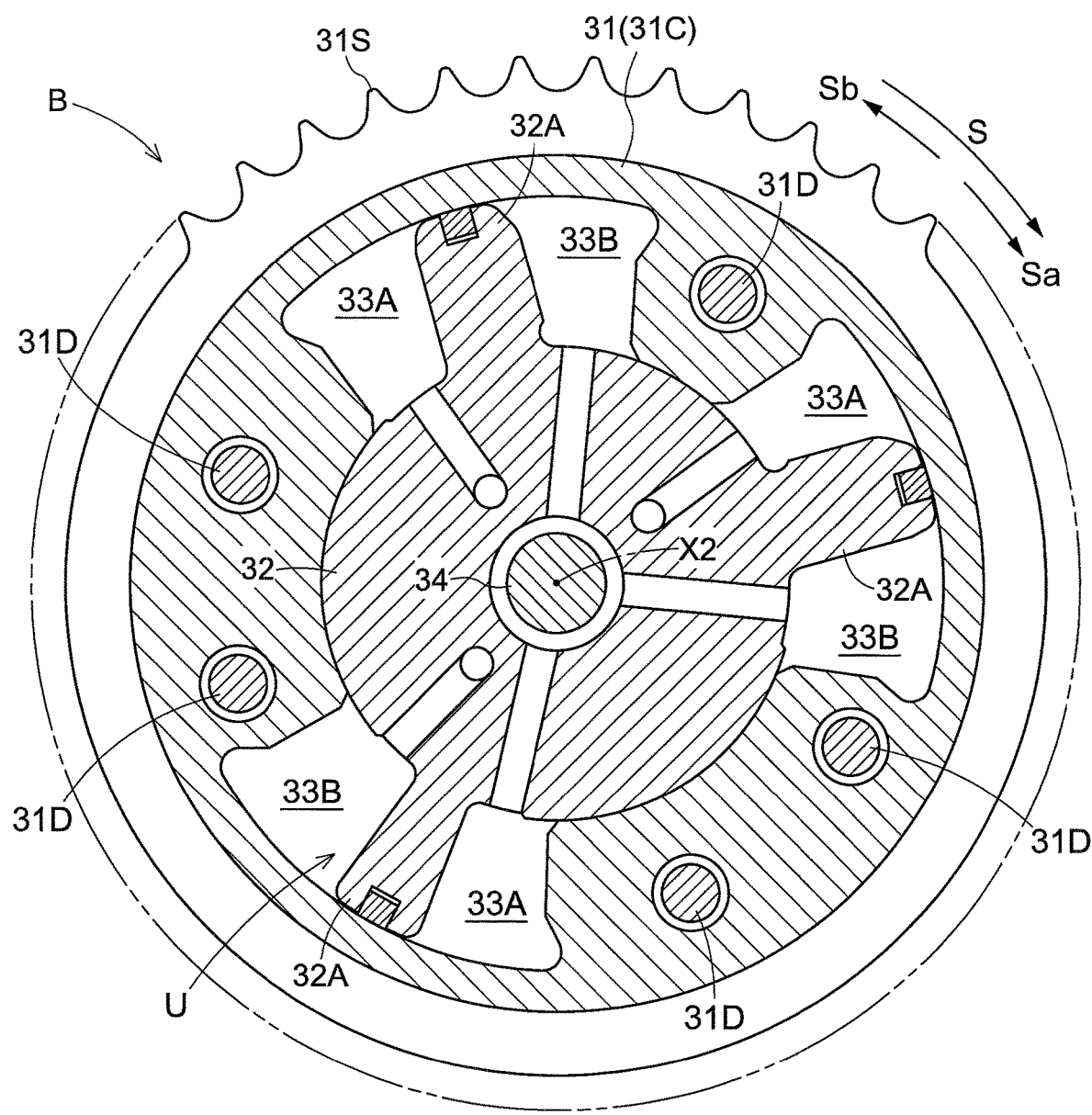
FIG. 5 is a section taken along a line V-V in FIG. 4.

The exhaust side valve opening/closing timing control apparatus B, as shown in FIGS. 4 and 5, includes an exhaust side case 31, an exhaust side rotor 32, and a hydraulic operation mechanism U for setting a relative rotational phase between the exhaust side case 31 and the exhaust side rotor 32 by means of an oil pressure.

The exhaust side case 31 is disposed coaxially with a second axis X2 which constitutes also a rotational axis of the exhaust cam shaft 13 and forms the exhaust side sprocket 31S in its outer circumference. This exhaust side case 31 is configured such that a front plate 31A and a rear plate 31B clamps a rotor body 31C therebetween and these members are fastened to each other with fastener bolts 31D. The exhaust side rotor 32 is mounted coaxially with the second axis X2 and rotatably relative to the exhaust side case 31. The exhaust side rotor 32 is connected to the exhaust cam shaft 13 with a connecting bolt 34 to be rotatable in unison with the exhaust cam shaft 13.

As the exhaust side rotor 32 is enclosed within the exhaust side case 31, there are formed a plurality of pressure chambers therebetween. The exhaust side rotor 32 forms a plurality of partitioning portions 32A protruding outwards and as these partitioning portions 32A partition the pressure chambers, advancing chambers 33A and retarding chambers 33B are formed.

With this exhaust side valve opening/closing timing control apparatus B, when receiving the driving force from the timing chain 8, the entire apparatus B is rotated in a driving rotational direction S. And, a direction of displacement in the same direction as the driving rotational direction S of the relative rotational phase of the exhaust side rotor 32 relative to the exhaust side case 31 by the hydraulic operation mechanism U will be referred to as an advancing direction Sa and a displacement in the opposite direction thereto will be referred to as a retarding direction Sb, respectively.

The exhaust side rotor 32 defines advancing passages communicated to the advancing chambers 33A and retarding passages communicated to the retarding chambers 33B. The engine E includes a hydraulic pump P driven by a driving force of the crank shaft 6 and an electromagnetic type phase control valve 45 for selectively feeding/discharging work oil from the hydraulic pump P to/from the advancing passages and the retarding passages.

The hydraulic pump P is configured to feed a lubricant oil of the oil pan 4 as "work oil" to the phase control valve 45. With position setting of this phase control valve 45, the work oil is fed to the advancing chamber 33A for displacing the relative rotational phase in the advancing direction Sa. Conversely, the work oil is fed to the retarding chamber 33B for displacing the relative rotational phase in the retarding direction Sb. In this way, the hydraulic operation mechanism U is constructed in the hydraulic system for displacing the relative rotational phase by way of oil pressure.

This exhaust side valve opening/closing timing control apparatus B has an arrangement which is basically same as the technique disclosed in Japanese Unexamined Patent Application Publication Hei. 10-103030, Japanese Unexamined Patent Application Publication Hei. 10-227236, etc.

[Controlling Arrangement]

Figure 6:
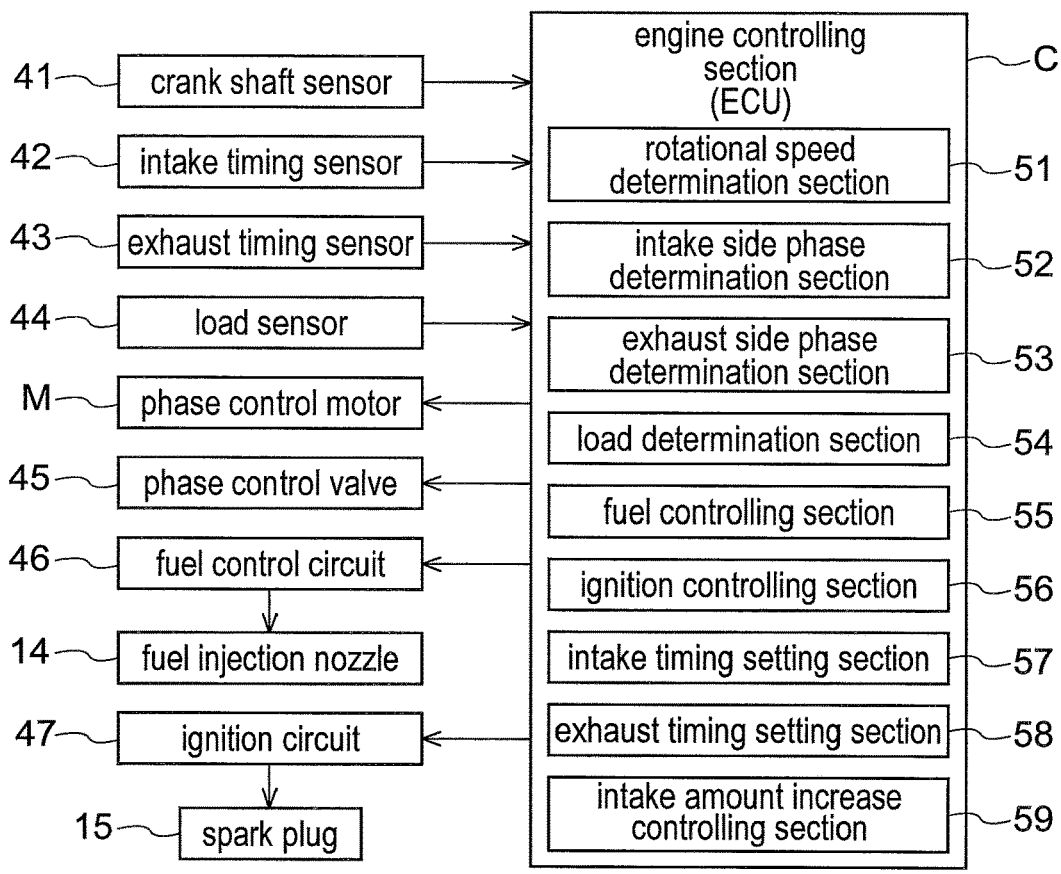
FIG. 6 is a block diagram of a control system.

The engine controlling section C functions as an ECU for managing an operational state of the engine E and, as shown FIG. 1 and FIG. 6, inputs signals from a crank shaft sensor 41 (an example of a "rotational speed sensor"), an intake timing sensor 42 (an example of a "phase sensor"), an exhaust timing sensor 43 (another example of a "phase sensor"), and a load sensor 44. Further, the engine controlling section C outputs control signals to the phase control motor M for realizing displacement of the relative rotational phase of the intake side valve opening/closing timing control apparatus A, the phase control valve 45 for realizing the displacement of the exhaust side valve opening/closing timing control apparatus B, a fuel control circuit 46 for controlling the fuel injection nozzle 14, and an ignition circuit 47 for controlling the spark plug 15.

The crank shaft sensor 41 used herein comprises a pickup type, etc. so as to output a detection signal when the crank shaft 6 reaches a predetermined rotational phase. And, by counting such detection signals, detection of the rotational speed (rotational sped per unit time) of the crank shaft 6 is made possible. The intake timing sensor 42 used herein comprises a pickup type, etc. so as to output a detection signal when the exhaust side rotor 32 reaches a predetermined rotational phase. The exhaust timing sensor 43 used herein comprises a pickup type, etc. so as to output a detection signal when the exhaust side rotor 22 reaches a predetermined rotational phase. The load sensor 44 detects a torque which acts on the crank shaft 6. Incidentally, the load sensor 44 is not limited to the arrangement of detecting a load acting on a driving system, but can also be arranged to determine that the higher the load, the greater the opening degree of the throttle valve 18 based on a signal that detects an opening degree of the throttle valve 18.

Incidentally, when a relative rotational phase of the intake side valve opening/closing timing control apparatus A (or the exhaust side valve opening/closing timing control apparatus B) is to be acquired, there is executed an operation of e.g. calculating a time difference between the detection timing of the crank shaft sensor 41 and the detection timing of the intake timing sensor 42 (or the exhaust timing sensor 43) or referring to a table data based on such time difference.

The engine controlling section C includes a rotational speed determination section 51, an intake side phase determination section 52, an exhaust side phase determination section 53, a load determination section 54, a fuel controlling section 55, an ignition controlling section 56, an intake timing setting section 57, an exhaust timing setting section 58, and the intake amount increase controlling section 59. It is originally assumed that these sections are constituted of software. However, these can be constituted of hardware formed of circuits having logic, etc. or can be combination of software and hardware.

The rotational speed determination section 51 determines a rotational speed (rotational speed per unit time) of the crank shaft 6 by counting signals from the crank shaft sensor 41. The intake side phase determination section 52 determines relative rotational phase of the intake side valve opening/closing timing control apparatus A, based on relationship between the detection timing of the signal of the crank shaft sensor 41 and the detection timing of the signal at the intake timing sensor 42. Similarly, the exhaust side phase determination section 53 determines relative rotational phase of the exhaust side valve opening/closing timing control apparatus B, based on relationship between the detection timing of the signal of the crank shaft sensor 41 and the detection timing of the signal at the exhaust timing sensor 43. The load determination section 54 determines a load acting on the engine E, based on detection signals of the load sensor 44.

The fuel controlling section 55 sets a feeding timing of fuel, based on detection signals from the crank shaft sensor 41 and the intake timing sensor 42 and causes the fuel injection nozzle 14 to inject fuel through the fuel control circuit 46.

The ignition controlling section 56 sets ignition timings of a plurality of spark plugs 15 based on detection signals from the crank shaft sensor 41 and the intake timing sensor 42, thus driving the spark plugs 15 via the ignition circuit 47, for realizing ignitions.

The intake timing setting section 57 sets a target rotational phase based on an operational state of the engine E and sets a relative rotational phase of the intake side valve opening/closing timing control apparatus A through control of the phase control motor M. At the time of this control, as described above, the relative rotational phase is maintained by causing the phase control motor M to rotate at the equal speed to that of the intake cam shaft 12, and with speed increase or decrease from this speed, displacement of the relative rotational phase in the advancing direction or retarding direction is realized.

The exhaust timing setting section 58 sets a target rotational phase based on an operational state of the engine E and sets a relative rotational phase of the exhaust side valve opening/closing timing control apparatus B through control of the phase control valve 45. At the time of this control, as the work oil from the hydraulic pump P is fed to the advancing chamber 33A and the work oil is discharged from the retarding chamber 33B, the relative rotational phase is displaced in the advancing direction. Conversely, as the work oil is fed to the retarding chamber 33B and the work oil is discharged from the advancing chamber 33A, the relative rotational phase is displaced in the retarding direction. Incidentally, in case the relative rotational phase is to be maintained, feeding and discharging of work oil are stopped by the phase control valve 45.

An intake amount increase controlling section 59 realizes control for increasing an intake amount without changing the opening timing of the intake valve 10, in case a rotational speed of the engine E is below the set value and a load detected by the load sensor 44 exceeds a predetermined value.

[Controlling Mode]

Figure 7:
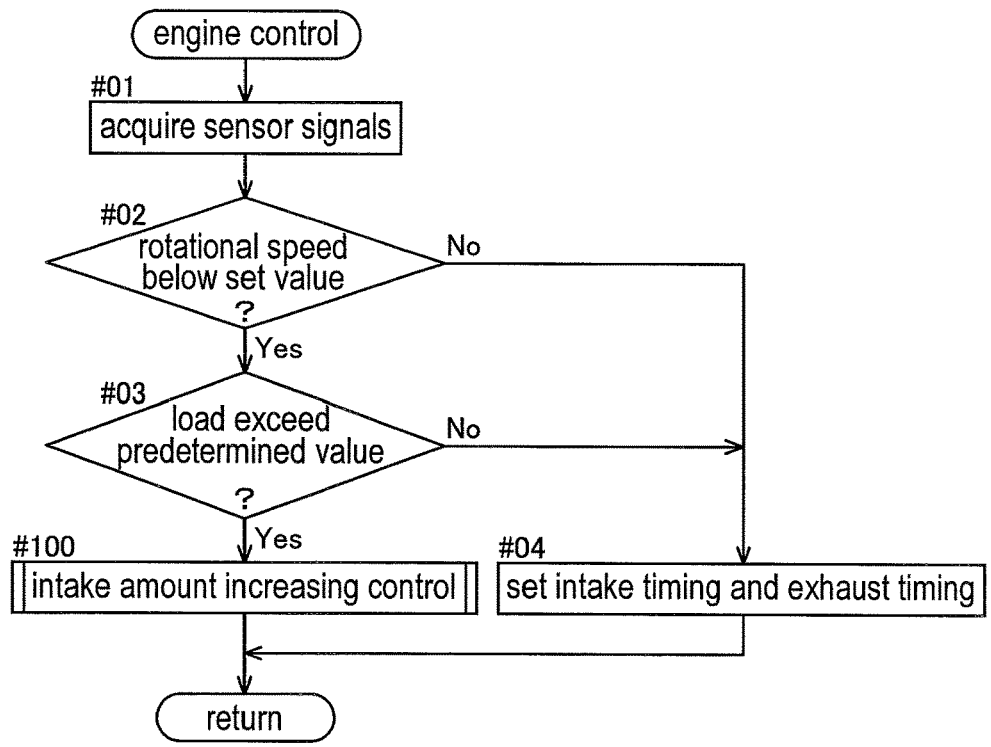
FIG. 7 is a flowchart of an engine control.

An overview of the controlling mode of the engine E by the engine controlling section C is shown in the form of a flowchart in FIG. 7 as an engine controlling routine. In this control, if the rational speed is determined as below the predetermined value based on detection result of the crank shaft sensor 41 and the load is determined to exceed the predetermined value based on the detection result of the load sensor 44 (steps #01-03), the process moves onto the intake amount increasing control routine (step #100). Conversely, if the load does not exceed the set value, the process sets the intake timing by the intake side valve opening/closing timing control apparatus A based on the acquired information and sets the exhaust timing by the exhaust side valve opening/closing timing control apparatus B (step #04).

Figure 9:
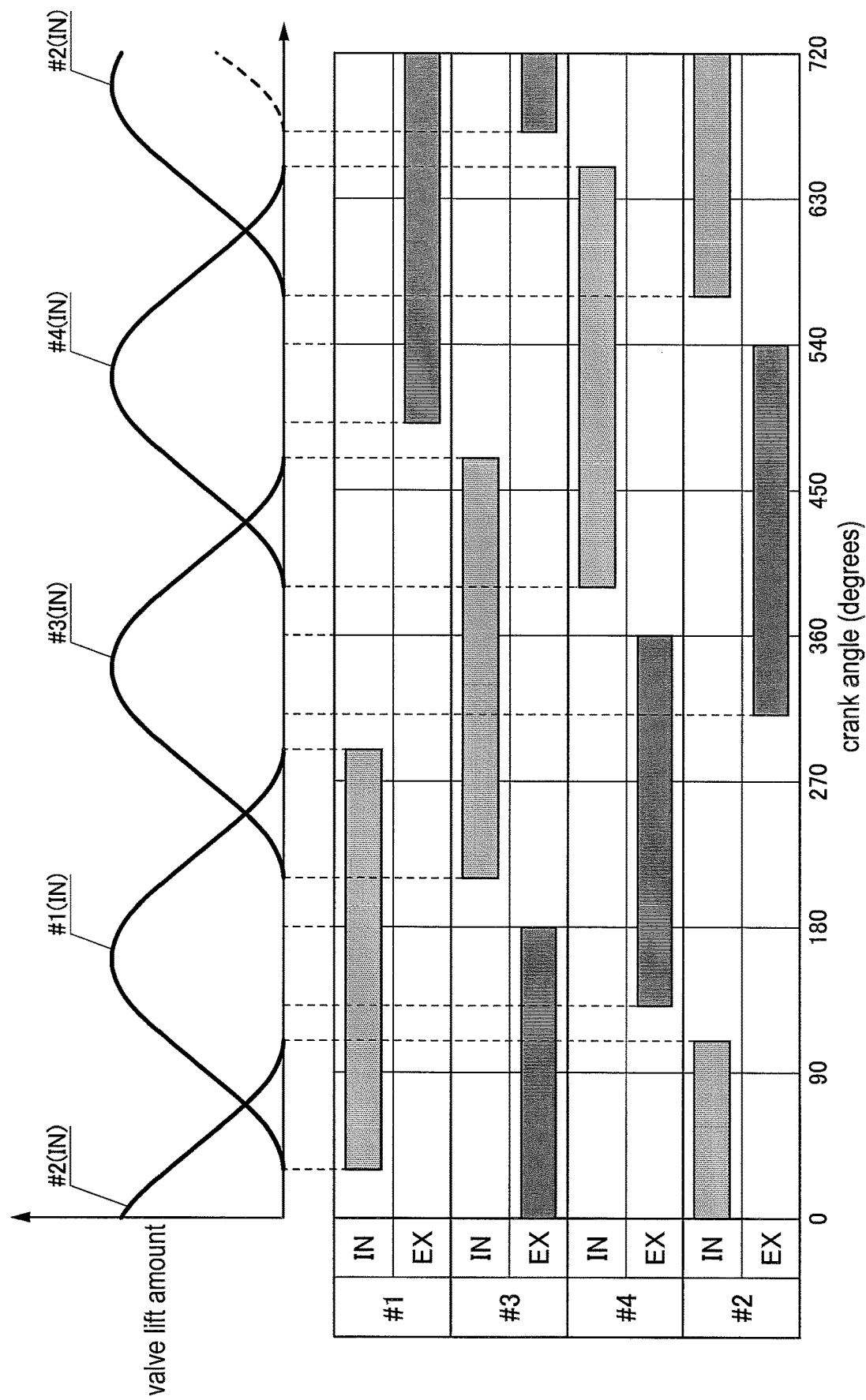
FIG. 9 is a chart showing valve lift curves and regions of opening/closing operations of an exhaust valve and an intake valve of a plurality of cylinders.

As the engine E is a four-cylinder type, while the intake cam shaft 12 effects 720 degrees of rotation (two rotations) as shown in FIG. 9, in the order set for the four cylinders, the intake valves 10 for the respective cylinders are opened/closed. Namely, the first through fourth cylinders are denoted as #1-#4 and as shown in the same figure, intake, compression, combustion (expansion) and exhaust are effected in the respective cylinders, in the order of first cylinder #1, third cylinder #3, fourth cylinder #4 and second cylinder #2.

Further, in the flowchart shown in FIG. 9, a crank angle is represented by the horizontal axis and lift amounts of the intake valve 10 and the exhaust valve 11 are represented by the vertical axis. In the drawing, an exhaust valve lift curve EX and an intake valve lift curve IN directly reflect cam profiles of the intake cam shaft 12 and the exhaust cam shaft 13, respectively.

Figure 10:
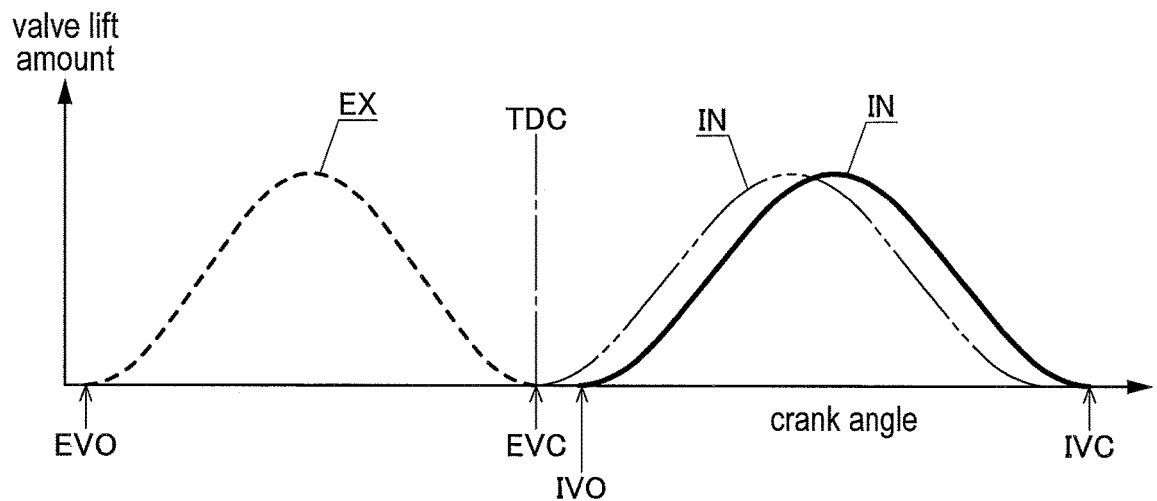
FIG. 10 is a chart for explaining intake timing of the exhaust valve and the intake valve.

FIG. 10 shows, in an enlarged scale, a portion of the flowchart of FIG. 9 as an example of the control effected at step #04. Namely, the intake valve lift curve IN denoted by a solid line corresponds to the region from an opening timing IVO to a closing timing IVC of the intake valve 10.

At step #04, for instance, when the rotational speed of the engine E exceeds the predetermined value, if the relative rotational phase of the intake side valve opening/closing timing control apparatus A is displaced in the advancing direction based on a load detected by the load sensor 44, the intake valve lift curve IN is shifted to the left side as indicated by a virtual line (two-dot chain line), thus advancing the intake timing.

Further, though not shown in the drawing, if the relative rotational phase of the intake side valve opening/closing timing control apparatus A is displaced in the retarding direction, the intake valve lift curve IN is shifted to the right side in the same drawing, thus retarding the intake timing. With such control, it is also possible to create an overlap of simultaneous opening of the exhaust valve 11 and the intake valve 10. With this control, an operation of the engine E with the optimal fuel consumption or with required torque is realized.

The intake amount increase control (step #100) is realized by control of the intake amount increase controlling section 59, according to which increase of the intake amount is sought for by operations of displacing the relative rotational phase of the intake side valve opening/closing timing control apparatus A in the advancing direction and the retarding direction during a period from the opening timing of the intake valve 10 to an opening timing of a next cylinder, in all of the cylinders.

Figure 8:
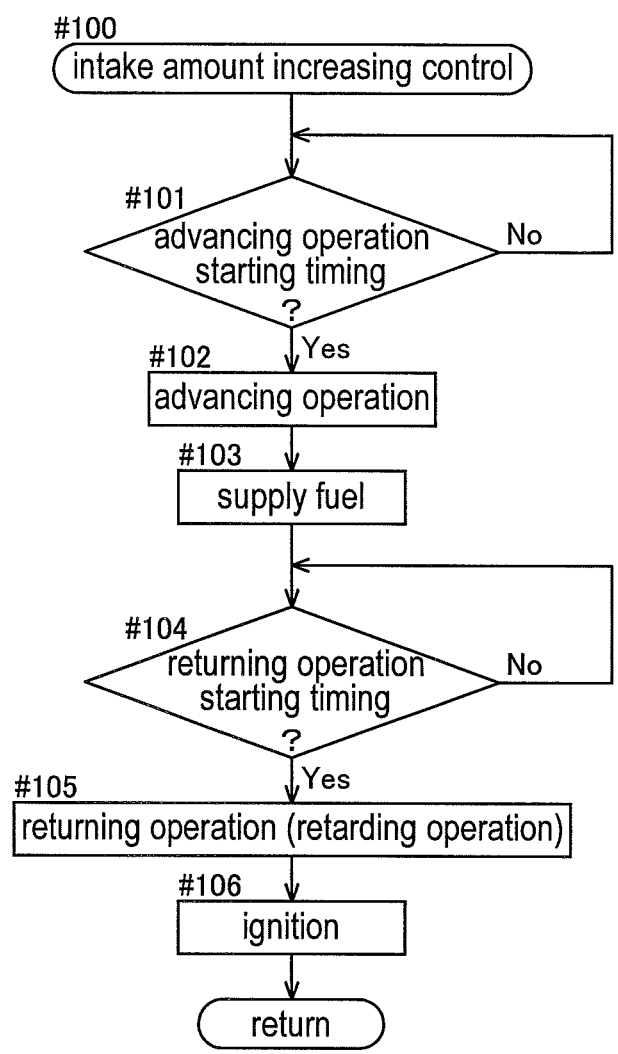
FIG. 8 is a flowchart of an intake amount increasing control.

Namely, as shown in FIG. 8, upon detection of arrival at the starting timing of the advancing operation based on a detection signal from the crank shaft sensor 41, the process starts the advancing operation for displacing the relative rotational phase of the intake side valve opening/closing timing control apparatus A in the advancing direction Sa through control of the speed of the phase control motor M (steps #101, #102).

Figure 11:
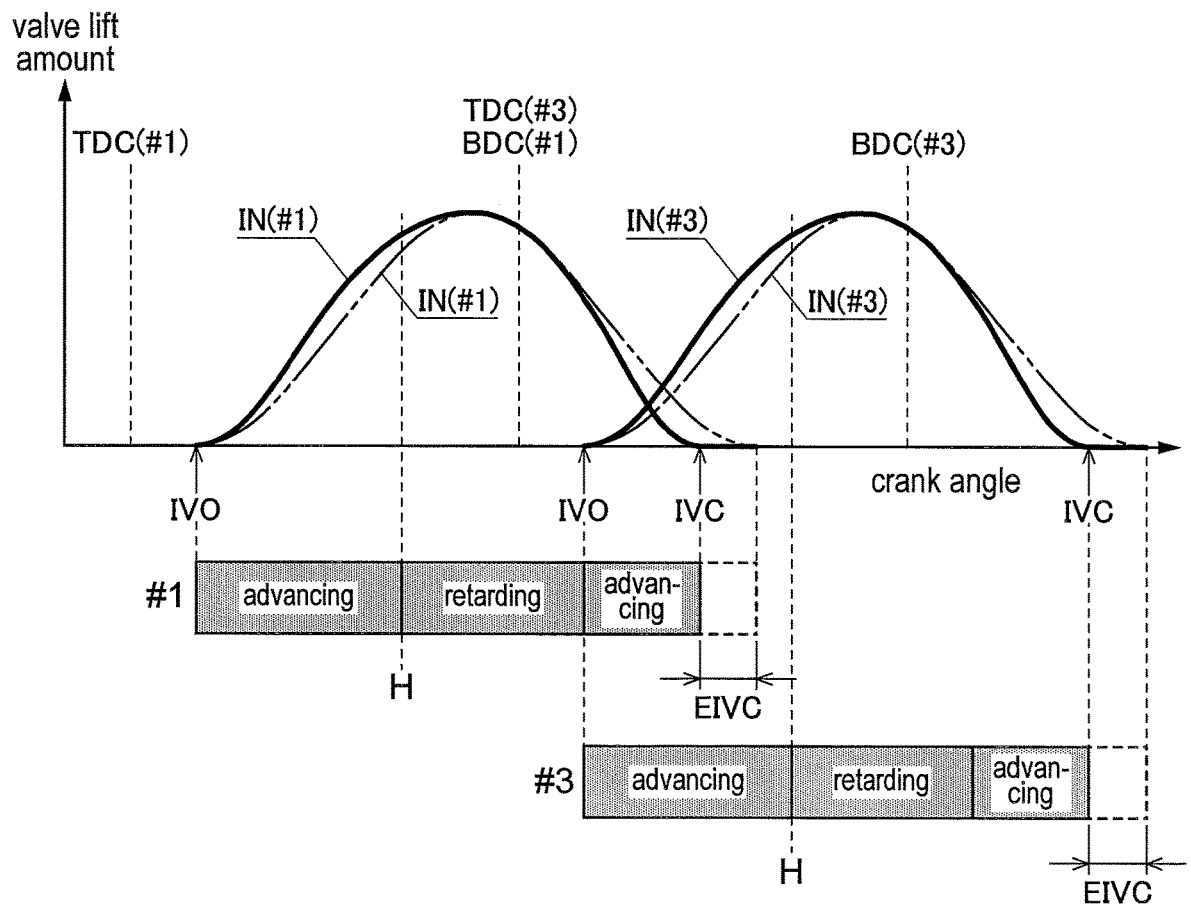
FIG. 11 is a chart showing a intake valve lift curve and timings of an advancing operation and a retarding operation by the intake side valve opening/closing timing control apparatus in the intake amount increasing control.

In FIG. 11, the intake valve lift curve IN shown on the left side by the virtual line directly reflects the cam profile of the intake cam shaft 12 of the first cylinder (#1). Further, the intake valve lift curve IN shown on the right side by the virtual line directly reflects the cam profile of the intake cam shaft 12 of the third cylinder (#3) which is to effect intake next.

In this control, the advancing operation starting timing is set to agree to the opening timing IVO of the intake valve 10.

Further, the opening timing IVO of this intake valve 10 is set to a timing slightly retarded from the top dead center TDC of the piston 5.

Therefore, in the intake valve lift curve IN of the intake valve 10 after the control, as indicated by the solid line in the same drawing, after arriving at the opening timing, the relative rotational phase is displaced in the advancing direction, so that the front half of the intake valve lift curve IN is deformed to bulge in the advancing direction, thus realizing increase of the intake amount.

Incidentally, in this control, the advancing operation starting timing is cased to agree to the opening timing IVO of the intake valve 10. Alternatively, the advancing operation starting timing can also be set to a timing slightly retarded from this opening timing IVO.

Further, at the time of execution of the advancing operation, upon detection of arrival at a fuel supply timing based on a detection result of the crank shaft sensor 41, fuel is supplied from the fuel injection nozzle 14 under the control of the fuel controlling section 55 (step #103).

When fuel is supplied as described above, increase of supplied fuel is provided in correspondence with the increased intake amount, thus realizing increase of output of the engine E.

Next, upon detection of arrival at the retarding operation (returning operation) starting timing based on a detection signal from the crank shaft sensor 41, in order to return the relative rotational phase of the intake side valve opening/closing timing control apparatus A to the original phase through control of the speed of the phase control motor M, the process effects a returning operation for retarding the relative rotational phase (steps #104, #105). Incidentally, the retarding starting timing H can be set to any desired timing.

With execution of the retarding operation at step #105, as shown in FIG. 11, the rear half region in the intake valve lift curve IN is deformed to move in the retarding direction. With this, in comparison with the intake valve lift curve IN represented by the virtual line, the closing timing IVC of the intake valve 10 is advanced as compared with the intake valve lift curve IN denoted by the virtual line, whereby improvement of the compression ratio in the combustion chamber is made possible. This operation for advancing the closing timing IVC is referred to as EIVC, which suppresses the phenomenon of air-fuel mixture being blown back from the intake valve 10 to the intake passage side during a compression operation of the piston 5.

In this control, the intake valve lift curve IN corresponding to one cylinder is affected by an advancing operation and a retarding operation of the intake side valve opening/closing timing control apparatus A and a part of an advancing operation for a next cylinder. Namely, with this control, as a consequence, the front half of the intake valve lift curve IN is deformed to bulge in the advancing direction, and the rear half of the intake valve lift curve IN is moved to return in the retarding direction. With this, the closing timing IVC of the intake valve 10 is advanced.

Next, subsequent to the compression operation, combustion of air-fuel mixture is effected by providing electric power to the spark plug 15 under control of the ignition controlling section 56 (step #106). After this combustion, the exhaust valve 11 is opened to effect exhaust. In particular, at step #106, improvement of output is provided by effecting ignition advancement of advancing the ignition timing.

Incidentally, during an operation of the engine E, the intake valve 10 is subjected to a cam fluctuation torque in the retarding direction from the intake cam shaft 12. Thus, in comparison with the speed of displacement in the advancing direction, the speed of displacement in the retarding direction is made higher. In this control, an operational amount of the phase control motor M in the advancing direction is set equal to an operational amount of the phase control motor M in the retarding direction. However, in consideration to the effect of the cam fluctuation torque, the driving period of the phase control motor M in the advancing direction is set longer than the driving period thereof in the retarding direction. Incidentally, it is also possible to effect a duty control such that an electric power for the advancing operation of the phase control motor M may be set greater than an electric power for the retarding operation of the same.

Function/Effect of Embodiment

The intake side valve opening/closing timing control apparatus A using the electrically powered phase control motor M is capable of effect displacement in the advancing direction and displacement in the retarding direction by short interval, when the engine E is under a low rotational speed state. With utilization of this advantage, in a situation of the engine E being at a low rotational speed, if it is determined that the load detected by the load sensor 44 exceeds the predetermined value, during the unit period from the opening timing IVO to the closing timing IVC of the intake valve 10, the relative rotational phase of the intake side valve opening/closing timing control apparatus A is displaced in the advancing direction first and then displaced in the retarding direction.

Thanks to the above-described control, in case the engine E is in a situation of low-speed, high-load, the intake amount to the combustion chamber is increased and also the fuel supply is increased, thus increasing the engine output and realizing smooth operation. In particular, the opening timing IVO of the intake valve 10 is set to a timing slightly retarded from the top dead center TDC of the piston 5. With this, the combustion chamber is exposed to a negative pressure when the intake valve 10 arrives at the opening timing IVO, so that with air intake, a tumble flow is generated in the combustion chamber, thereby to allow favorable mixing between the introduced air and the fuel, thus allowing suppression of the knocking phenomenon.

Further, at the time of low-rotation, high-load state, in the case of long overlap, this would sometimes invite knocking phenomenon due to abnormal combustion caused by influence of heat of residual gas to the air-fuel mixture. To this, by decreasing the overlap through setting of the closing timing IVC of the intake valve, the period of the heat of residual gas affecting the air-fuel mixture is shortened, thus realizing suppression of knocking phenomenon. Further, by effecting ignition advance, with ignition at a timing before the effect of residual gas heat causes abnormal combustion, suppression of knocking phenomenon is realized also.

Other Embodiments

Other configurations than that of the foregoing embodiment are also possible as follows.

(a) As the exhaust side valve opening/closing timing control apparatus B, like the intake side valve opening/closing timing control apparatus A, it is possible to employ a configuration that allows displacement of the relative rotational phase by means of the phase control motor M. With this configuration, displacements of the relative rotational phase of the exhaust side valve opening/closing timing control apparatus B can be effected at a high speed.

Also, the passages and the control value required for feeding/discharging of work oil can be omitted.

(b) For effective generation of the tumble flow, not only the setting of the opening timing IVO of the intake valve 10, the tumble control valve 19 can be used also in combination therewith.

(c) Both the intake side valve opening/closing timing control apparatus A and the exhaust side valve opening/closing timing control apparatus B can include a mechanism for adjusting the valve lift amount.

INDUSTRIAL APPLICABILITY

The present invention can be used in an internal combustion engine having an intake cam shaft equipped with a valve opening/closing timing control apparatus.

REFERENCE SIGNS LIST

5: piston
6: crank shaft
10: intake valve
12: intake cam shaft
21: driving side rotary body (intake side case)
22: driven side rotary body (intake side rotor)
41: rotational speed sensor (crank shaft sensor)
44: load sensor
A: valve opening/closing timing control apparatus (intake side valve opening/closing timing control apparatus)
C: controlling section
E: internal combustion engine (engine)
M: electrically powered actuator (phase control motor)
T: phase adjustment mechanism
X1: rotational axis (first axis)
IVO: opening timing
BDC: bottom dead center
TDC: top dead center

The invention claimed is:

1. A control unit for an internal combustion engine, the control unit comprising:
    a valve opening/closing timing control apparatus including:
        a driving side rotary body rotatable about a rotational axis in synchronism with a crankshaft of an internal combustion engine;
        a driven side rotary body mounted rotatably about the rotational axis relative to the driving side rotary body, the driven side rotary body rotates together with an intake cam shaft controlling opening/closing of a plurality of intake valves of the internal combustion engine; and
        a phase adjustment mechanism configured to set a relative rotational phase between the driving side rotary body and the driven side rotary body;
    the intake cam shaft being configured to open/close the plurality of intake valves of a plurality of cylinders with a predetermined rotational angular spacing between the plurality of intake valves;
    after an opening timing of an intake valve of the plurality of intake valves, an advancing operation being effected to displace the relative rotational phase in an advancing direction relative to the opening timing; and
    subsequently, the relative rotational phase being displaced in a direction of a retarding operation releasing the advancing operation in order to cause an intake valve of the plurality of intake valves of another cylinder, which is to effect an intake operation next, to open at an original opening timing, wherein:
    the phase adjustment mechanism sets the relative rotational phase between the driving side rotary body and the driven side rotary body by an electrically powered actuator,
    there is provided a controlling section controlling the electrically powered actuator, and
    the controlling section sets a period required for the advancing operation longer than a period required for the retarding operation.

2. The control unit of claim 1, wherein the opening timing is set after passage of a piston of a combustion chamber of the internal combustion engine through a top dead center.

3. The control unit of claim 1, further comprising
    a rotational speed sensor detecting a rotational speed per unit time of the crankshaft;
    a phase sensor detecting the relative rotational phase; and
    a load sensor detecting a load applied to an output transmission system from the crankshaft;
    wherein the controlling section controls the electrically powered actuator, based on detection results of the rotational speed sensor, the phase sensor and the load sensor, when it is determined from a result of detection of the rotational speed sensor that a rotational speed per unit time of the crankshaft is below a set value.

* * * * *